UNITED STATES PATENT OFFICE.

FRIEDRICH BREYER, OF KOGEL, AUSTRIA-HUNGARY.

PROCESS OF SOFTENING WATER.

SPECIFICATION forming part of Letters Patent No. 717,536, dated January 6, 1903.

Application filed October 19, 1901. Serial No. 79,272. (No specimens.)

*To all whom it may concern:*

Be it known that I, FRIEDRICH BREYER, a subject of the Emperor of Austria-Hungary, residing at Kogel, near Neulengbach, in the Province of Lower Austria, in the Empire of Austria-Hungary, have invented certain new and useful Improvements in Processes of Softening Water; and I do hereby declare the following to be a full, clear, and exact description of the invention, such as will enable others skilled in the art to which it appertains to make and use the same.

This invention relates to a process for softening in the cold water particularly for use in steam-raising, so as to prevent formation of boiler-scale.

The process renders possible a filtration of the mineral constituents separated from the water, and thus effects a complete purification of the feed-water. For this purpose the separated mineral constituents are caused to deposit in a crystalline form on a pulverulent material acting as a carrier—such as ground brick, slag, pumice-stone, or kieselguhr—which has preferably been treated with calcium hydroxid to attach to it microscopical crystals. By the increased affinity thus imparted to the pulverulent material the separated mineral constituents settle on the latter more quickly than they otherwise would. The carrying material is suspended by stirring in the water to be purified, so that every particle is in proper condition for the separated constituents to adhere to it, and by insuring an excess of alkalinity, which is diminished again before filtration, the most rapid and complete separation is effected.

Before carrying out the purification process proper the preparation of the carrier on which the crystals are to settle must be undertaken. This is done by grinding well-heated bricks or other materials already mentioned to a fine powder and heating this with water and fifty parts, by weight, of calcium hydroxid until about one-fifth of the liquid is evaporated. By subsequent cooling microscopical crystals separate on each particle of the powder. The mixture prepared in this manner is now used in purifying the water as follows: One part of the mixture, calculated as dry, is mixed with one thousand parts of the water to be softened, preferably in a cylindrical vessel, and the liquid is stirred by blowing air into the vessel from the bottom. When this movement begins, caustic soda is added in such proportion that the scale-forming constituents in the water are separated and crystallize on the separate particles of the pulverulent carrier suspended in the water. During this part of the process sufficient caustic lime is added to insure a strongly alkaline reaction. Crystals of calcium carbonate now begin to attach themselves to the particles of the carrier and favor the formation of crystalline concretions formed by conglomeration of several particles of the carrier covered with crystals. The excess of alkalinity is now diminished by saturation with carbon dioxid and the liquid is filtered. The filtrate is returned to the filter so long as it is turbid until a crystal-clear liquid runs through. The separation of crystals on the pulverulent carrier occurs also, albeit in a less satisfactory manner, if the carrier is added to the water to be softened without having been submitted to the preliminary treatment with calcium hydroxid.

I claim—

1. The process, which consists in treating a pulverulent inert carrier with lime to form a crystalline coating on the fine particles thereof, mixing the dry lime-coated pulverulent carrier with the water to be purified so as to be held in suspension therein, adding caustic soda and caustic lime to the water and precipitating the excess of lime, substantially as described.

2. The process, which consists in treating a pulverulent inert carrier with lime to form a crystalline coating on the fine particles thereof, mixing the dry lime-coated pulverulent carrier with the water to be purified, so as to be held in suspension therein, adding caustic soda and caustic lime to the water, blowing carbon dioxid thereinto to precipitate the excess of lime and filtering the water, substantially as described.

In testimony that I claim the foregoing as my invention I have signed my name in presence of two subscribing witnesses.

FRIEDRICH BREYER.

Witnesses:
ALVESTO S. HOGUE,
AUGUST FUGGER.